United States Patent [19]

Edwards

[11] Patent Number: 5,095,756
[45] Date of Patent: Mar. 17, 1992

[54] LINEAR MOVEMENT SENSORS

[76] Inventor: Eric F. R. Edwards, 130, City Road, Cardiff, Great Britain, CF2 3DR

[21] Appl. No.: 603,695

[22] PCT Filed: May 19, 1989

[86] PCT No.: PCT/GB89/00555
§ 371 Date: Nov. 19, 1990
§ 102(e) Date: Nov. 19, 1990

[87] PCT Pub. No.: WO89/11633
PCT Pub. Date: Nov. 30, 1989

[51] Int. Cl.$^5$ ............................................. G01B 7/18
[52] U.S. Cl. ............................................. 73/774; 338/6
[58] Field of Search ................... 338/2, 6, 223, 224, 338/225; 73/774

[56] References Cited

U.S. PATENT DOCUMENTS

| 2,734,978 | 2/1956 | Balgin | 338/2 X |
| 3,719,913 | 3/1973 | DuBose et al. | 338/2 |
| 3,808,678 | 5/1974 | Kubo et al. | 338/2 X |

FOREIGN PATENT DOCUMENTS 213800  3/1958  Australia ............................. 338/6

Primary Examiner—Jerry W. Myracle
Attorney, Agent, or Firm—Young & Thompson

[57] ABSTRACT

High tensile electrically-conductive filaments 1 are connected to the two ends of an electrically-conductive elastic block 2 and the whole is embedded within an elastic covering 3. As the sensor is put under tension the elastic block stretches and the resistance of the sensor, as measured between the two sets of filaments 1, increases proportionally to the degree of extension.

5 Claims, 1 Drawing Sheet

LINEAR MOVEMENT SENSORS

This invention relates to a sensor of linear position or tension. Linear sensors are currently designed around rigid systems and are relatively heavy. It is an object of this invention to provide a light flexible sensor of linear displacement and tension.

Accordingly this invention provides a linear movement sensor whose change of length can be measured, the sensor comprising an electrically-conductive block which is elastically deformable between the two ends thereof, and electrically-conductive non-deformable contacts connected to the ends of the block.

The resistivity of the sensor will change as the block is stretched or allowed to contract, and this change can be measured and will be proportional to the degree of change of the length of the block.

Preferably the block and at least part of the contacts are enclosed within an elastically deformable, electrically-non-conductive sleeve. This sleeve will act to protect and to electrically insulate the block and its connection to the contacts.

The block is ideally formed from a natural or synthetic rubber material with a particulate electrically-conductive material dispersed therethrough or distributed over the surface of the block. Possible synthetic materials which might be used could be selected from nitryl, neoprene, butyl and silicon rubbers, polyurethane, polyethylene, polystyrene and hypalon. The conductive material may be carbon or metal powder or carbon "pearls". For example carbon pearls, with a size of about $5 \times 10^{-3}$ mm, could be poured into liquid latex and the material would be rolled immediately to a desired thickness or shape before coagulation becomes complete. The elastic block could be of a sponge-like nature.

In one preferred construction the contacts comprise high tensile electrically-conductive filaments. Alternatively the contacts could comprise electrical terminals secured to the ends of the block.

The invention further extends to a measurement device comprising a sensor of the invention as hereinbefore defined together with means for measuring electrical resistance connected across the contacts of the block. This means is advantageously a Wheatstone's bridge, with the sensor comprising one of the arms of the bridge. The device would then be temperature independant. Alternatively, by maintaining the rest of the bridge at a constant temperature the temperature of the sensor can be calculated as this temperature will be proportional to the measured resistance.

The invention may be performed in various ways and preferred embodiments will now be described, by way of example, with reference to the accompanying drawings, in which.

Figure 1:
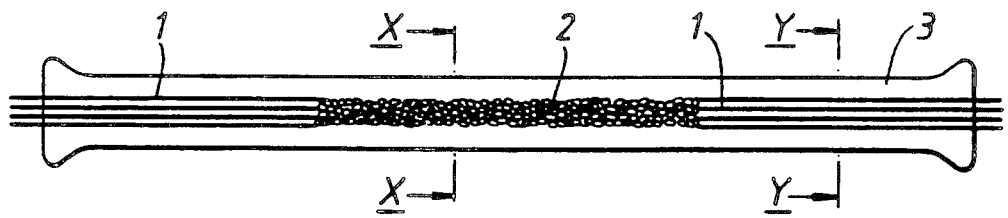
FIG. 1 is a longitudinal cross-section through a sensor of this invention.
Figure 2:
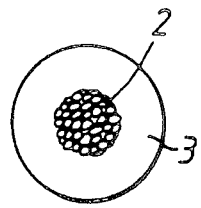
FIGS. 2 and 3 are sections on lines X—X and Y—Y of FIG. 1.
Figure 3:
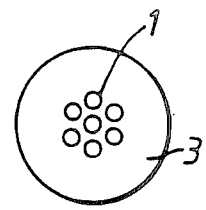

In the embodiment shown in FIGS. 1 to 3 a flexible sensor comprises electrically-conductive high-tensile filaments 1 which are attached to each side of an electrically-conductive elastic block 2 formed to required dimensions to give predetermined performance characteristics. The whole is then coated in an elastic covering 3. The filaments 2 are used to make electrical contacts through which an electrical current is passed. The resulting electrical resistance is measured and is proportional to the degree of linear displacement and tension being applied to the sensor at any given moment, which causes distortion of the conductive elastic block 2, thus altering its electrical resistance characteristics.

Figure 4:
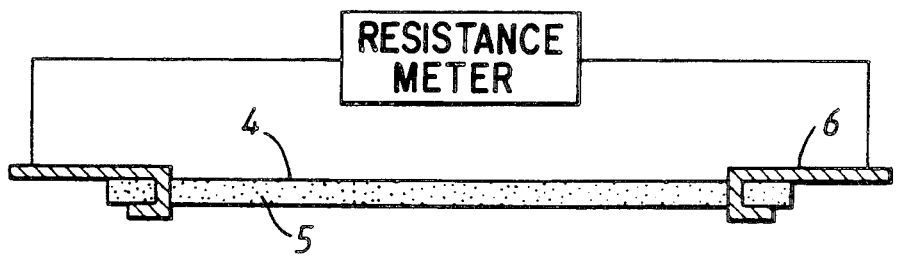
FIG. 4 is a longitudinal cross-section through another form of sensor of this invention.

The sensor shown in FIG. 4 comprises a latex block 4 throughout which are dispersed carbon "pearls" 5. Alternatively the "pearls" could be distributed over the surface of the block 4. Metal terminals 6 are pinned to ends of the block 4.

The sensor could be used for a variety of purposes, and is particularly suited for use adjacent to a linear actuator or over the joint of an artificial or robotic articulated limb to give an indication of the status of the actuator or joint.

I claim:

1. A linear movement sensor whose change of length can be measured, the sensor comprising an electrically-conductive block formed from a solid natural or synthetic rubber material with a particulate electrically-conductive material in the form of carbon "pearls" dispersed therethrough, such that said block is elastically deformable between the two ends thereof, and electrically-conductive non-deformable contacts connected to the ends of the block.

2. A sensor according to claim 1, wherein the contacts comprise high tensile electrically-conductive filaments.

3. A sensor according to claim 1, wherein the contacts comprise electrical terminals secured to the ends of the block.

4. A measurement device comprising a sensor according to claim 1, together with means for measuring electrical resistance connected across the contacts of the block.

5. A device according to claim 4, wherein the means for measuring electrical resistance is a Wheatstone's bridge, with the sensor comprising one of the arms of the bridge.

* * * * *